United States Patent [19]

Baine

[11] Patent Number: 5,016,354

[45] Date of Patent: May 21, 1991

[54] CIRCULAR CUTTING DEVICE

[76] Inventor: James R. Baine, 9374 Kempster Ave., Fontana, Calif. 92335

[21] Appl. No.: 395,979

[22] Filed: Aug. 21, 1989

[51] Int. Cl.⁵ ............................................. B27B 9/04
[52] U.S. Cl. ...................................... 30/371; 30/372; 83/745
[58] Field of Search ................. 30/372, 373, 374, 375, 30/293, 371; 83/745

[56] References Cited

U.S. PATENT DOCUMENTS

| 4,128,940 | 12/1978 | Ong ................................... 83/745 X |
| 4,799,315 | 1/1989 | Ziegler ................................. 30/293 |

Primary Examiner—Douglas D. Watts
Assistant Examiner—Rinaldi Rada
Attorney, Agent, or Firm—Harvey S. Hertz

[57] ABSTRACT

A circular cutting device for cutting planar material along a predetermined radius utilizing a saw having a blade member. The saw is mounted on a saw base having a raised edge. An end plate has a front end positioned adjacent the saw base raised edge and has an attachment mechanism for securing the end plate to the saw base. An adjustment bar has a longitudinal slot formed therein, the adjustment bar being attached to the end plate at a side opposite to the end plate front edge. An extension bar has an axis extending generally parallel to the axis of the adjustment bar and is slidably movable with respect to the adjustment bar. The extension bar is secured to the adjustment bar along the axes. The extension bar is secured to the material to be cut.

2 Claims, 2 Drawing Sheets

CIRCULAR CUTTING DEVICE

BACKGROUND OF THE INVENTION

1. Field of the Invention

The field of art to which the invention pertains includes the field of circular cutting devices, and more particularly, with respect to a hand-held circular saw which can be used to cut material along an adjustable predetermined radius.

2. Description of the Prior Art

Devices for cutting material along a predetermined radius are well known. For example U.S. Pat. No. 4,602,434 there is illustrated a device using a circular hand saw in FIG. 8 where the material to be cut is provided with a pin secured to the material to be cut and connected to a cutting device such as a hand-held circular power saw by means of an arm which can be a cable or flat bar. However, such a device is not easily adjusted for various length radii. In addition, such devices are not easily attachable to the conventional hand-held circular saw.

Other known prior art includes U.S. Pat. No. 2,819,742; 4,628,608; 2,943,392; 4,621,427; 4,262,421; and 4,414,745.

The present invention can be easily attached to the saw base of a conventional hand held circular saw and adjusted for various radii.

SUMMARY OF THE INVENTION

A circular cutting device for cutting planar material along a predetermined radius utilizing a saw having a blade member. The saw is mounted on a saw base having a raised edge. An end plate having a front end is positioned adjacent the saw base raised edge and has an attachment mechanism for securing the end plate to the saw base. An adjustment bar has a longitudinal slot formed therein. The adjustment bar is attached to the end plate at a side opposite to the end plate front edge. An extension bar has an axis extending generally parallel to the axis of the adjustment bar and is slidably movable with respect to the adjustment bar. The extension bar is secured to the adjustment bar along the axes. Further, the extension bar is secured to the material to be cut.

The advantages of this invention both as to its construction and mode of operation, will be readily appreciated as the same becomes better understood by reference to the following detailed description when considered in connection with the accompanying drawings in which like reference numerals indicate like parts throughout the figures.

DESCRIPTION OF THE PREFERRED EMBODIMENT

Figure 1:
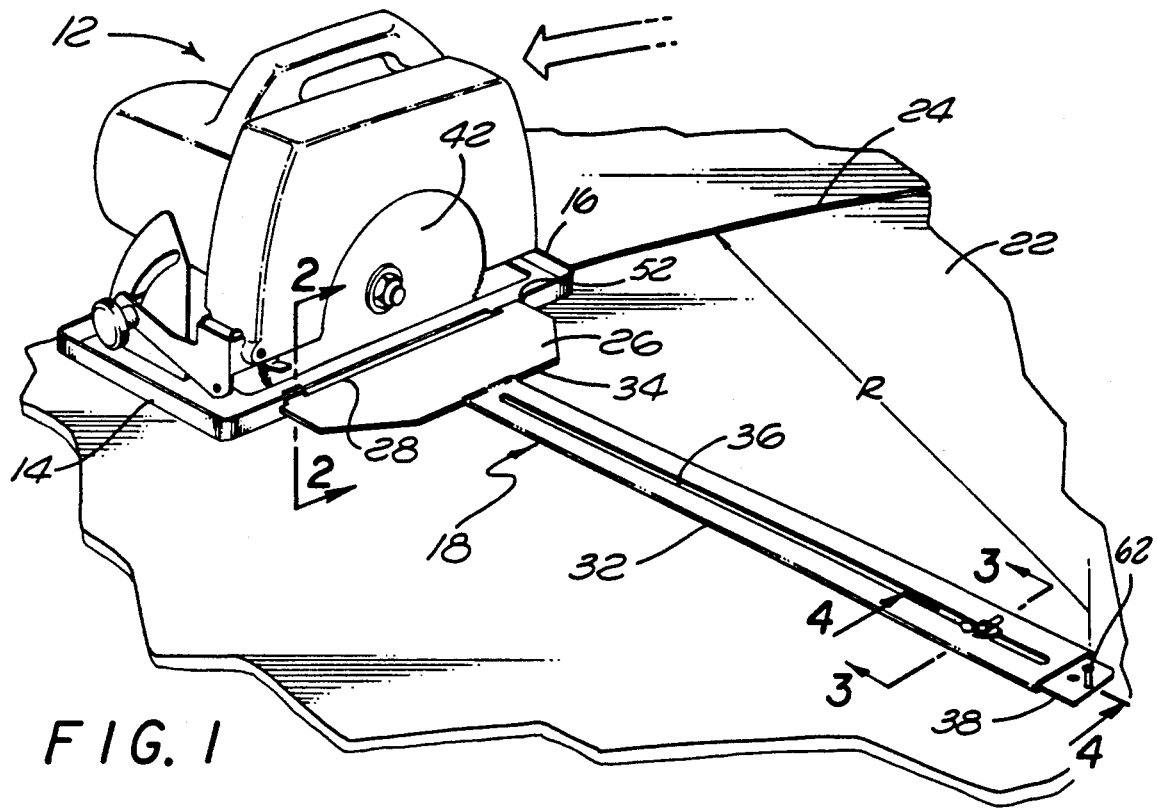
FIG. 1 is a perspective view of a circular cutting device according to the invention.

Referring now to the drawings, there is shown in FIG. 1 a circular cutting device constructed in accordance with principles of the invention. The device includes a conventional hand-held circular saw 12 mounted on a saw base 14. The saw base 14 contains a raised edge 16 to which a cutting device 18 is attached. By utilizing the cutting device 18, the circular saw 12 can be used to cut the material 22 along the edge 24 which defines a radius.

The circular cutting device includes an end plate 26 which is attached at its front edge 28 to the raised edge 16 of the saw base 14. An adjustment bar 32 is attached to the rear edge 34 of the end plate 26 and has a longitudinally extending slot 36 formed therein. As illustrated in FIG. 1, a short extension bar 38 is slidably movable within the adjustment bar 32 and enables the device to cut material having a radius slightly greater than the distance from the circular saw blade 42 to the free end of the adjustment bar 32 or less than this distance. As will be explained hereinafter, for radii much greater than the distance between the circular saw blade 42 and the free end of the adjustment bar 32 a different extension bar is provided.

Figure 2:
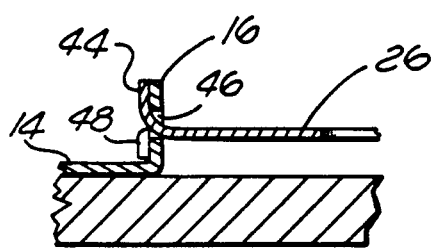
FIG. 2 is a partial cross-sectional view taken along the line 2—2 of FIG. 1.

Referring now to FIG. 2, the attachment of the end plate 26 to the raised edge 16 of the saw base 14 is shown in greater detail. An upwardly extending tang 44 extends from the front edge 28 of the end plate 26 and can be slidably positioned through a slot 46 formed in the raised edge 16. Similarly, a downwardly extending tang 48 (shown in FIG. 1 and more clearly in FIG. 5) sits over a depression 52 formed along the top surface of the raised edge 16. Thus, the end plate 26 can be easily attached to and removed from the saw base 14 at the raised edge 16.

Figure 3:
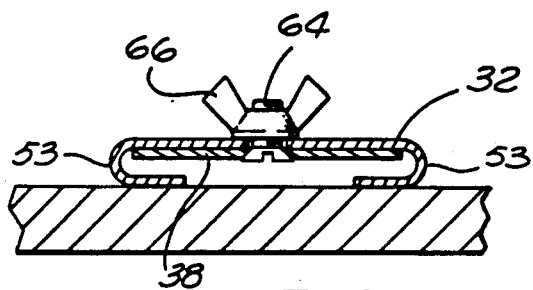
FIG. 3 is a cross-sectional view taken along the line 3—3 of FIG. 1.

As illustrated in FIG. 3, the adjustment bar 32 side edges 53 extend inwardly towards each other along the bottom surface to form an enclosed area in which the short extension bar 38 can be retained and moved with respect to the adjustment bar.

Figure 5:
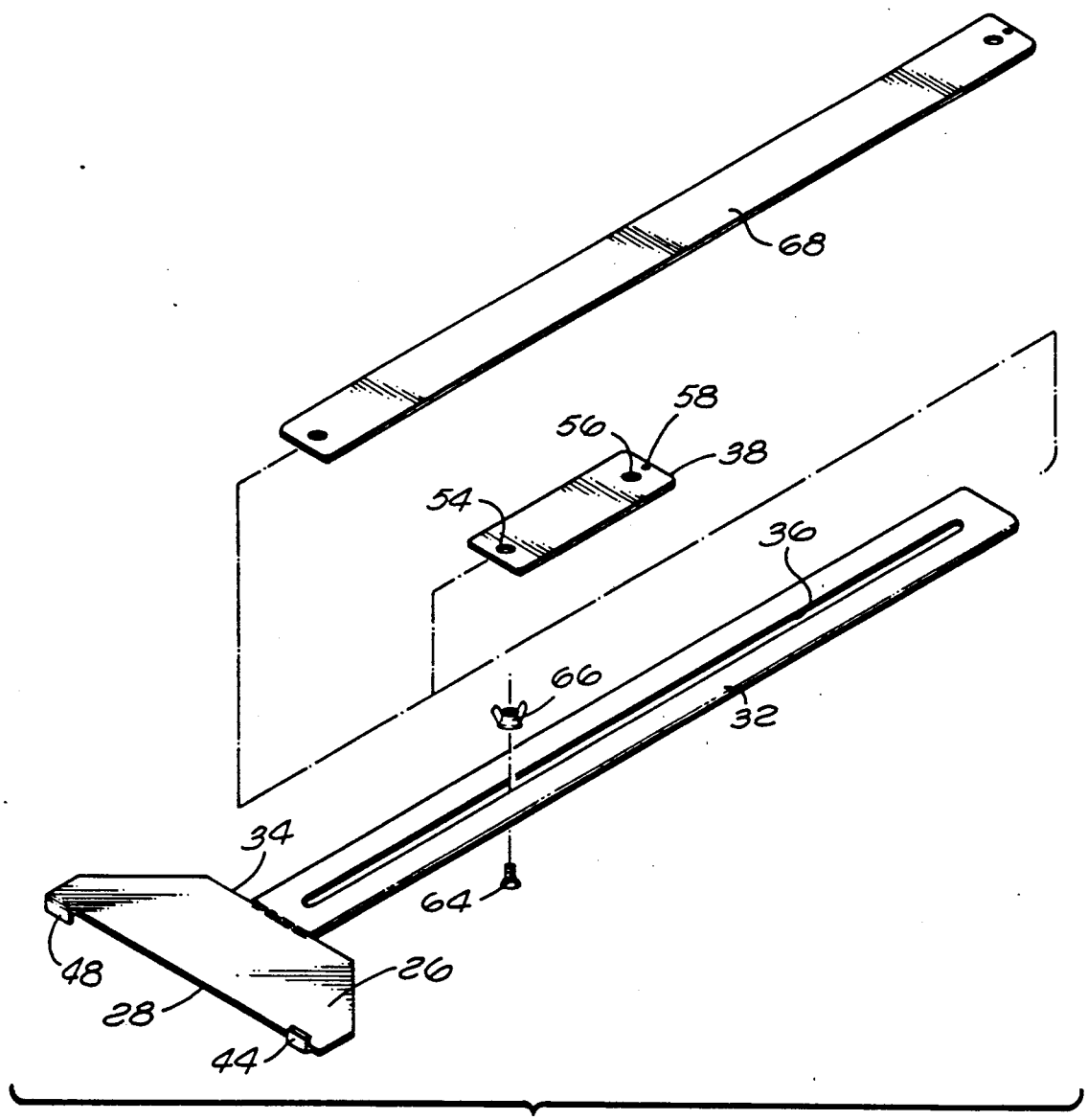
FIG. 5 is an exploded perspective view of the invention illustrating two alternative embodiments thereof.

As shown in FIG. 5, the short extension bar 38 is of generally rectangular configuration and contains generally enlarged opening 54 and 56, respectively, near the longitudinal ends of the extension bar. In addition, a reduced diameter opening 58 is positioned between the end of the extension bar 38 and the enlarged opening 56. This reduced diameter opening 58 enables a nail 62 (FIG. 1) to be driven into the material 22 to determine one end of the radius R, the other end of which would be the circular saw blade 42. Once the length of the radius R is determined, a bolt 64 (FIG. 3) is positioned through one of the openings 54 and 56 and the slot 36 of the adjustment bar 32. A nut 66, such as wing-nut, is then used to lock the adjustment bar 32 and the extension bar 38 together in a manner shown in FIGS. 1 and 3.

Figure 4:
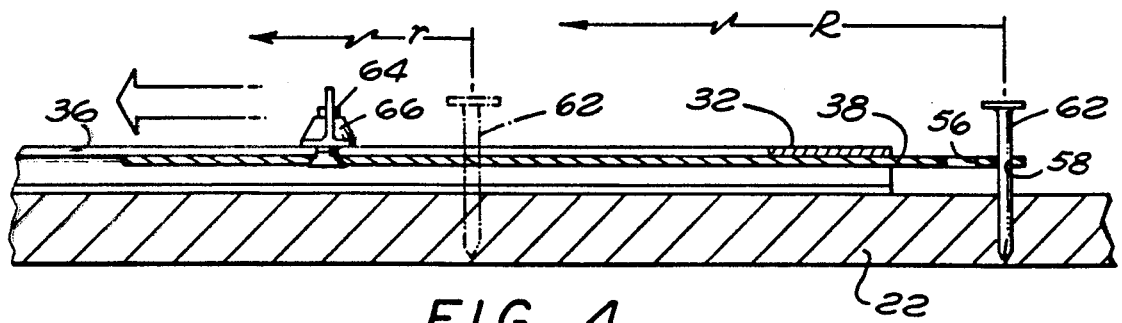
FIG. 4 is a cross-sectional view taken along the line 4—4 of FIG. 1.

FIG. 4 also illustrates the securing of the extension bar 38 to the adjustment bar 32 as well as an alternative arrangement shown in dotted lines of the nail 62 being positioned within the slot 36 for those situations where the radius R of the material to be cut is less than the distance from the saw blade 42 to the free end of the adjustment bar 32.

Referring again to FIG. 5, a long bar 68 can be used in place of the short extension bar 38 in those situations where a longer radius is to be cut than that which can be cut when using the short extension bar extending beyond the adjustment bar 32. It should be noted that the extension bars 38 and 68 are similar in shape, although of different lengths.

I claim:

1. A circular cutting device for cutting planar material along a predetermined radius utilizing a saw having a blade member, said saw being mounted on a saw base having a raised edge with a slot and depression formed in said raised edge comprising:

an end plate having a front end positioned adjacent said saw base raised edge and having attachment means for securing said end plate to said saw base comprising an upwardly extending tang and a downwardly extending tang formed on said end plate front edge and positionable in said slot and depression of said saw base raised edge, respectively;

an adjustment bar having a longitudinal slot formed therein being attached to said end plate at a side opposite to said end plate front edge;

an extension bar having an axis generally parallel to the axis of said adjustment bar and being slidably movable with respect to said adjustment bar;

means for securing said extension bar to said adjustment bart along said axes; and means for securing said extension bar to said material to be cut.

2. A circular cutting device in accordance with claim 1, wherein said extension bar is telescopically movable within said adjustment bar.

* * * * *